(12) United States Patent
Firke et al.

(10) Patent No.: US 10,798,129 B2
(45) Date of Patent: Oct. 6, 2020

(54) CONSTRAINT-BASED MULTIUSE CERTIFICATES

(71) Applicant: eBay Inc., San Jose, CA (US)

(72) Inventors: Nikhil Firke, San Ramon, CA (US); Michael Chan, Cupertino, CA (US); Ralph Forsythe, Denver, CO (US); Brian Peter Dickson, San Jose, CA (US); Akhila Nama, San Jose, CA (US); Nigel Campbell, San Jose, CA (US); Sahil Chadha, San Jose, CA (US)

(73) Assignee: EBAY INC., San Jose, CA (US)

( * ) Notice: Subject to any disclaimer, the term of this patent is extended or adjusted under 35 U.S.C. 154(b) by 139 days.

(21) Appl. No.: 15/700,792

(22) Filed: Sep. 11, 2017

(65) Prior Publication Data

US 2019/0014151 A1   Jan. 10, 2019

Related U.S. Application Data

(60) Provisional application No. 62/530,425, filed on Jul. 10, 2017.

(51) Int. Cl.
*H04L 29/06* (2006.01)

(52) U.S. Cl.
CPC .......... *H04L 63/20* (2013.01); *H04L 63/0823* (2013.01); *H04L 63/10* (2013.01); *H04L 63/101* (2013.01)

(58) Field of Classification Search
CPC ...... H04L 63/20; H04L 63/10; H04L 63/0823
See application file for complete search history.

(56) References Cited

U.S. PATENT DOCUMENTS

| | | | |
|---|---|---|---|
| 7,840,813 B2 | 11/2010 | Canard et al. | |
| 8,656,490 B1* | 2/2014 | Sobel | H04L 61/1511 709/227 |
| 8,745,376 B2 | 6/2014 | Zaverucha | |
| 9,344,455 B2 | 5/2016 | Himawan et al. | |
| 2005/0257058 A1* | 11/2005 | Yoshida | H04L 29/06 713/175 |
| 2007/0074050 A1* | 3/2007 | Camiel | G06F 21/10 713/193 |
| 2008/0301564 A1* | 12/2008 | Smith | G06Q 10/06 715/741 |
| 2010/0169963 A1 | 7/2010 | Kleinpeter et al. | |
| 2016/0036593 A1* | 2/2016 | Saboori | H04L 63/0823 713/156 |
| 2016/0373262 A1 | 12/2016 | Shearer et al. | |
| 2017/0104749 A1* | 4/2017 | Koster | H04L 63/0823 |
| 2017/0171172 A1* | 6/2017 | Sullivan | H04L 63/061 |

* cited by examiner

*Primary Examiner* — Mohammed Waliullah
(74) *Attorney, Agent, or Firm* — Shook, Hardy & Bacon L.L.P.

(57) ABSTRACT

Multiuse certificates (e.g., wildcard certificates) can be associated with policies that specify one or more computational constraints, e.g., limited processor power, limited access time, limited access to file system usage, or limited memory access. An application associated with a multiuse certificate can be monitored to ensure that the specified computational constraints are not violated. Upon the computational constraints being violated, the multiuse certificate can be invalidated and/or authentication requests rejected.

19 Claims, 8 Drawing Sheets

CONSTRAINT-BASED MULTIUSE CERTIFICATES

RELATED APPLICATIONS

This application claims the priority benefit of U.S. Provisional Application No. 62/530,425, entitled "Constraint Based Wildcard Certificate Management," filed on Jul. 10, 2017, which is hereby incorporated by reference in its entirety.

TECHNICAL FIELD

Embodiments of the present disclosure relate generally to computer security and, more particularly, but not by way of limitation, to constraint-based multiuse certificates.

BACKGROUND

Digital certificates can be issued by a certificate authority to a server so that clients connecting to the server can authenticate the server as secure. Multiuse certificates, e.g., wildcard certificates, enable authentication of multiple subdomains of a domain. While efficient, multiuse certificates can create security issues. For example, if one of the subdomains covered by a multiuse certificate is compromised, then the other subdomains may be compromised and cannot be trusted.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A digital certificate is an electronic document that proves a computer's (e.g., a server's) identity to another computer (e.g., a client). For example, digital certificates in a public key infrastructure (PKI) may prove identity using asymmetric key pairs. A network site (e.g., a website or network service) can acquire a digital certificate from a certificate authority (CA). Certificate authorities are intermediaries which both clients and servers trust to manage issuance of digital certificates. In some example embodiments, the CA is a third-party public CA, such as Symantec®, that exists outside the server's network. In other example embodiments, the CA is a private entity (e.g., a private CA run by network administrators) that issues digital certificates inside the network (e.g., root certificates).

The CA grants a digital certificate to a network site after determining that the network site is not fraudulent (e.g., after checking and confirming WHOIS data of the entity requesting a certificate for a given domain). After the network site acquires the digital certificate from the CA, clients connecting to the network site can trust the network site for cryptographically secure communications based on the network site having a valid digital certificate.

Generally, a digital certificate applies to an individual domain, e.g., www.testsite.com. In contrast, multiuse certificates, ("wildcard certificates") are digital certificates that can be applied to different subdomains of a domain. For example, a multiuse certificate "*.testsite.com" can provide authentication for "subdomain1.testsite.com," "subdomain2.testsite.com," and so on (where the asterisk is a wildcard character). In this way, multiple subdomains can be authenticated using a single multiuse certificate instead of establishing a new digital certificate for every subdomain. Further, after a multiuse certificate is issued, new subdomains can be secured without contacting a third-party CA (e.g., a public CA) and waiting for a grant of a new certificate.

While efficient, multiuse certificates can create security issues. For example, if one of the subdomains covered by a multiuse certificate is compromised, a malicious entity can gain access to the private key of the certificate and use the private key to wreak havoc on applications operating on the other subdomains covered by the multiuse certificate. Further, if one of the subdomains needs to have its authorization revoked or modified, all of the subdomains may have to have their authorizations revoked or otherwise modified, thereby increasing management complexity.

To this end, a constraint-based network certificate system can use computational constraints to regulate applications covered by a multiuse certificate. Computational constraints are limits set on operating parameters of an application, computer, or virtual computer. Examples of operating parameters include how much processor power a given application is using, which files and directories a given application is accessing or has accessed, how much memory a given application is using, which segments or areas of memory a given application is accessing or has accessed, which network services have been accessed or requested, what time during the day a given application is active, read/write authorizations, and other functions of an application or computer.

Different applications can operate in different ways, using different operating parameters. For example, a database web application may require more processor power, more memory, and longer runtimes than a calendar web application. Each application can have a customized set of computational constraints which can be monitored to ensure that the application does not violate the constraints (e.g., by acting abnormally, for example by accessing files the application does not normally request, or by requiring more processor power than what is normal for the application type). If the computational constraints are violated, the multiuse certificate covering the subdomain in which the offending application is executing can be revoked. Further, the offending application may be reported to an administrator and suspended from operating.

In some example embodiments, policies are established that specify a plurality of computational constraints. Each policy can specify a different or an overlapping set of computational constraints to customize a given policy to operating parameters used by a given type of application. Each wildcard certificate can be associated with one or more policies. Information indicating which policy is associated with which constraints, and further which wildcard certificate is associated with which policies, is stored in a data store accessible by the constraint-based network certificate system, according to some example embodiments. The constraint-based network certificate system can then use the stored associations to monitor the applications stored at each subdomain by looking up how each application should be operating (i.e., within what computational constraints) and ensure the application does not operate outside its specified constraints. This approach further facilitates updates and modifications to wildcard management. In particular, as the associations are stored in a database, the constraints of a given policy can be updated by updating the associations in the data store.

Figure 1:
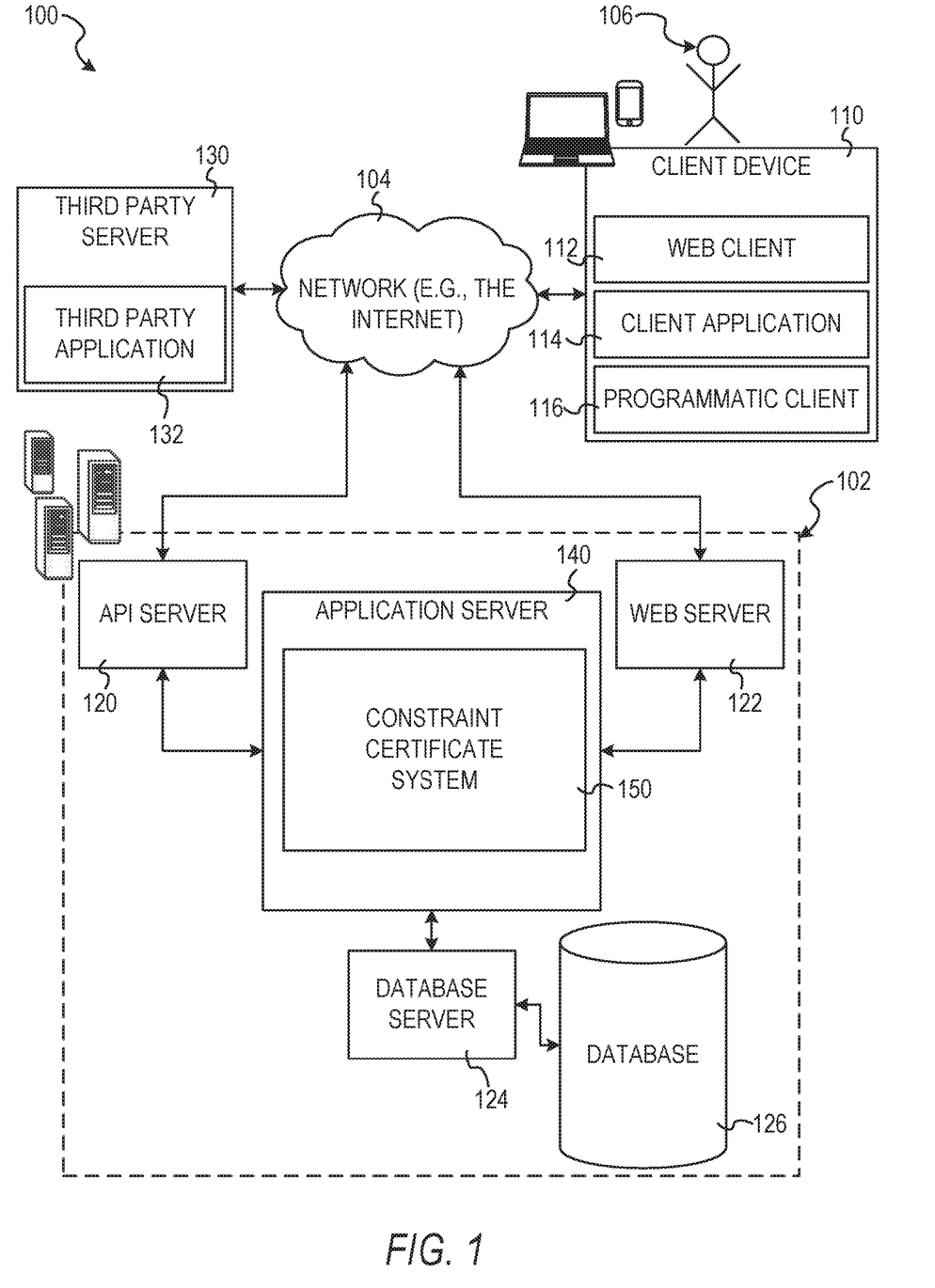
FIG. 1 is a block diagram illustrating a networked system, according to some example embodiments.

With reference to FIG. 1, an example embodiment of a high-level client-server-based network architecture 100 is shown. A networked system 102 provides server-side functionality via a network 104 (e.g., the Internet or a wide area network (WAN)) to one or more client devices 110. In some implementations, a user 106 interacts with the networked system 102 using the client device 110. FIG. 1 illustrates, for example, a web client 112 (e.g., a browser), a client application 114, and a programmatic client 116 executing on the client device 110. The client device 110 includes the web client 112, the client application 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic system, game console, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprise an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the public switched telephone network (PSTN), a cellular telephone network, a wireless network, a Wi-Fi® network, a Worldwide Interoperability for Microwave Access (Wi-MAX) network, another type of network, or any suitable combination thereof.

In some example embodiments, the client device 110 includes one or more of the client applications 114 (also referred to as "apps") such as, but not limited to, web browsers, book reader apps (operable to read e-books), media apps (operable to present various media forms including audio and video), fitness apps, biometric monitoring apps, messaging apps, and electronic mail (email) apps. In some implementations, the client applications 114 include various components operable to present information to the user 106 and communicate with the networked system 102.

The web client 112 accesses the various systems of the networked system 102 via the web interface supported by a web server 122. Similarly, the programmatic client 116 and client application 114 access the various services and functions provided by the networked system 102 via the programmatic interface provided by an application programming interface (API) server 120.

Users (e.g., the user 106) comprise a person, a machine, or other means of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The API server 120 and the web server 122 are coupled to, and provide programmatic and web interfaces respectively to, one or more application servers 140. The application server 140 can host a constraint certificate system 150, which can comprise one or more modules or applications, each of which can be embodied as hardware, software, firmware, or any combination thereof. The application server 140 is, in turn, shown to be coupled to a database server 124 that facilitates access to one or more information storage repositories, such as a database 126. In an example embodiment, the database 126 comprises one or more storage devices that store information to be accessed by the constraint certificate system 150 or the client device 110. Additionally, a third-party application 132, executing on a third-party server 130, is shown as having programmatic access to the networked system 102 via the programmatic interface provided by the API server 120. For example, the third-party application 132, utilizing information retrieved from the networked system 102, supports one or more features or functions on a website hosted by a third party.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the application server 140 (e.g., the constraint certificate system 150) can also be implemented as standalone software programs, which do not necessarily have networking capabilities.

Figure 2:
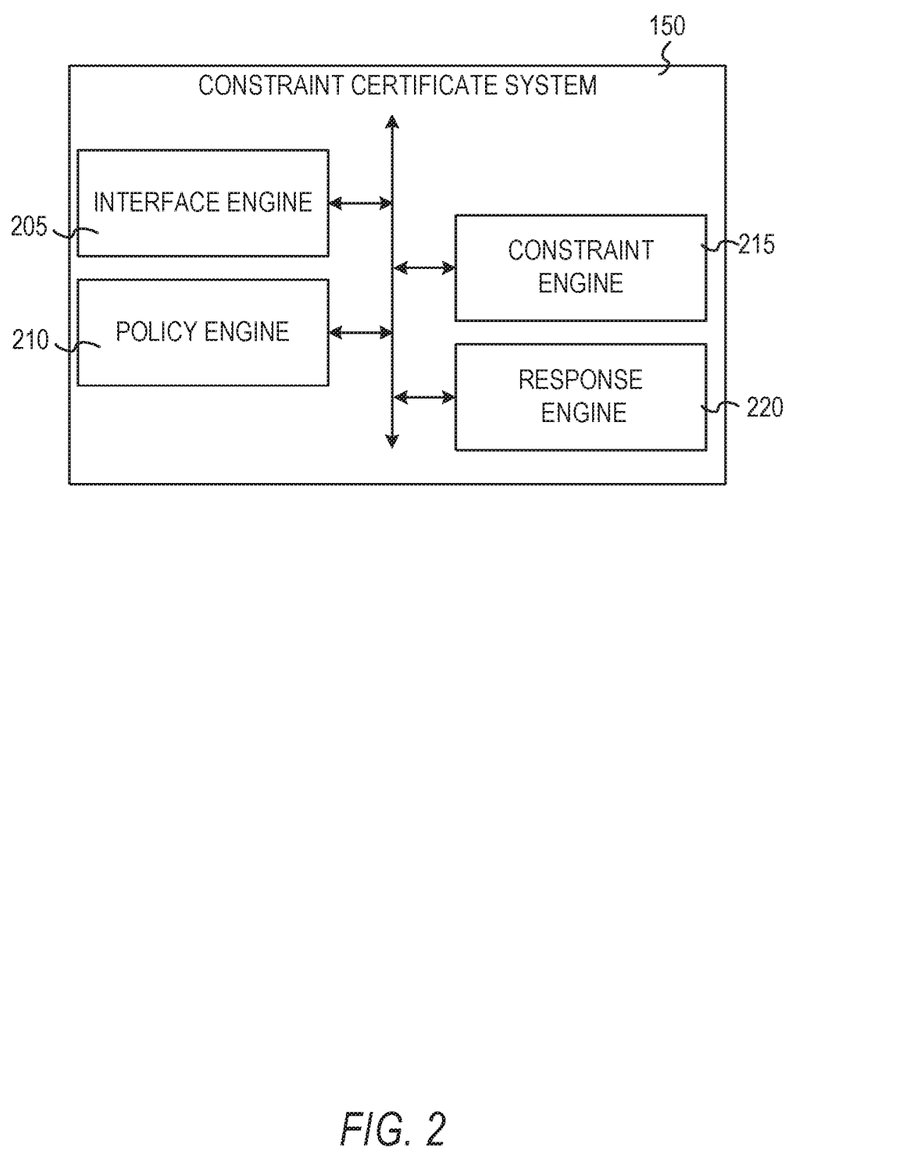
FIG. 2 illustrates example internal functional components of a constraint certificate system, according to some example embodiments.

FIG. 2 illustrates example internal functional components of a constraint certificate system 150, according to some example embodiments. As illustrated, the constraint certificate system 150 comprises an interface engine 205, a policy engine 210, a constraint engine 215, and a response engine 220. The interface engine 205 is configured to receive connection requests from client-side applications and set up secure sessions. The policy engine 210 manages storing and creating associations between or among policies, constraints, and multiuse certificates. The constraint engine 215 is configured to monitor applications to collect operational parameter data for analysis.

The response engine 220 is configured to analyze the stored operational parameter data and trigger responsive actions if one or more applications have violated or are currently violating their corresponding computational constraints. In some example embodiments, the responsive actions performed by the response engine 220 include revoking the multiuse certificate that covers the offending application (e.g., the application operating in a subdomain covered by a multiuse certificate), terminating or suspending the offending application, logging the violations, and outputting notifications or alerts to administrative users.

Figure 3:
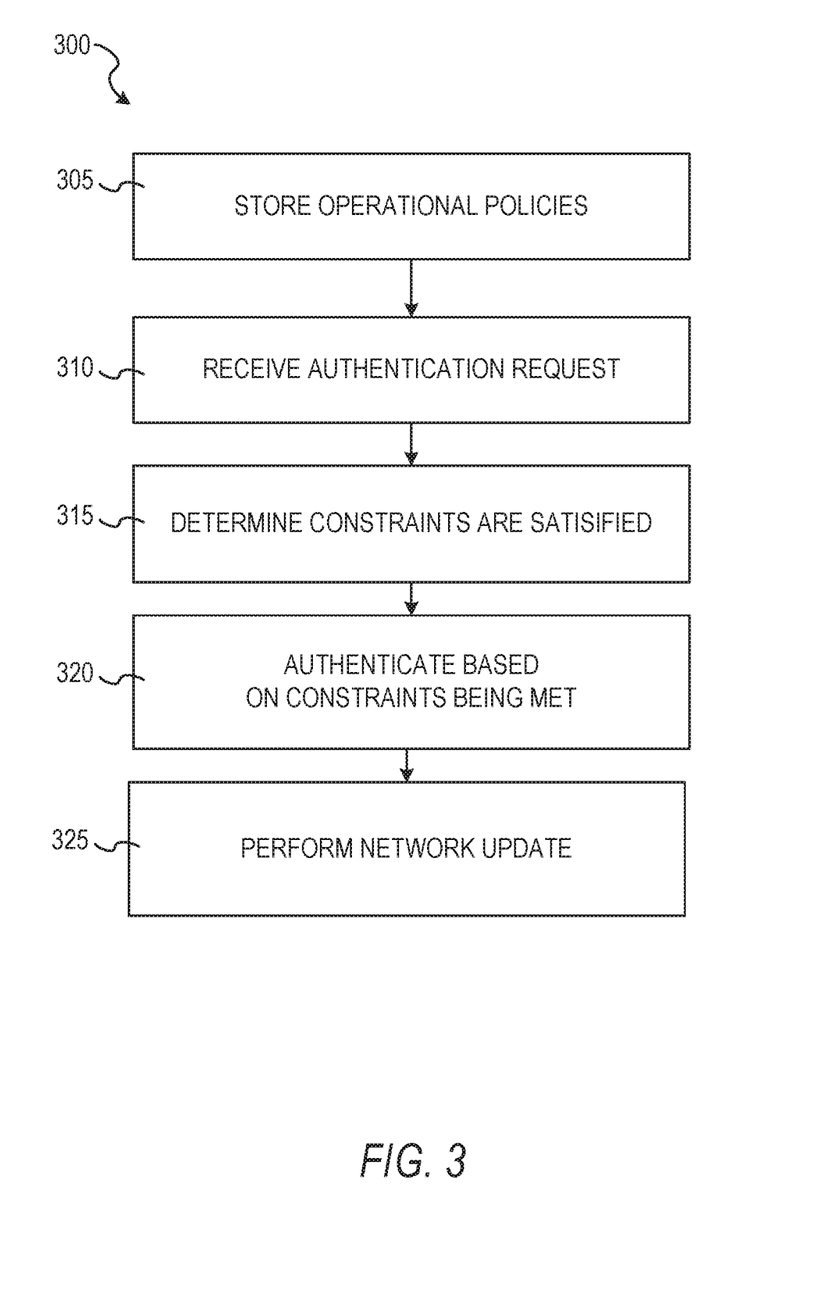
FIG. 3 shows a flow diagram of a method for managing a multiuse certificate, according to some example embodiments.

FIG. 3 shows a flow diagram of a method 300 for managing a multiuse certificate, according to some example embodiments. At operation 305, the policy engine 210 stores operational policies in a data store accessible to the constraint certificate system 150. Example data stores include the database 126 and wildcard data 525 discussed below. At operation 310, the interface engine 205 receives an authentication request (e.g., a connection request) from a client-side application. The authentication request may be a request to connect to a specific network service (e.g., application) operating from a subdomain covered by a particular multiuse certificate. As discussed, each multiuse certificate can be associated with one or more policies. At operation 315, in response to receiving the authentication request, the constraint engine 215 determines whether the network service has violated its computational constraints specified by the one or more policies. At operation 320, in response to determining that the requested network service has not violated its corresponding computational constraints, the constraint engine 215 authenticates the network service, e.g., by setting up a secure session between the client-side application that generated the request and the requested network service.

In some example embodiments, updates to the multiuse certificates are performed by updating associations stored in the data store. For example, an update may modify what constraints are assigned to what policy, which policies are assigned to which multiuse certificates, and so forth. Further, according to some example embodiments, values of multiuse certificates may be updated (e.g., to specify which policies govern a given multiuse certificate). Further, according to some example embodiments, values of the computational constraints may be updated (e.g., an allowed processor threshold may be updated, an allowed memory usage may be updated, allowed file systems may be updated, and so on). Updates to the data can be performed at any time, before deployment and also during deployment (while receiving connection requests). For example, as illustrated, after authentication occurs at operation 320, the policy engine 210 can update the multiuse certificate data at operation 325.

Figure 4:
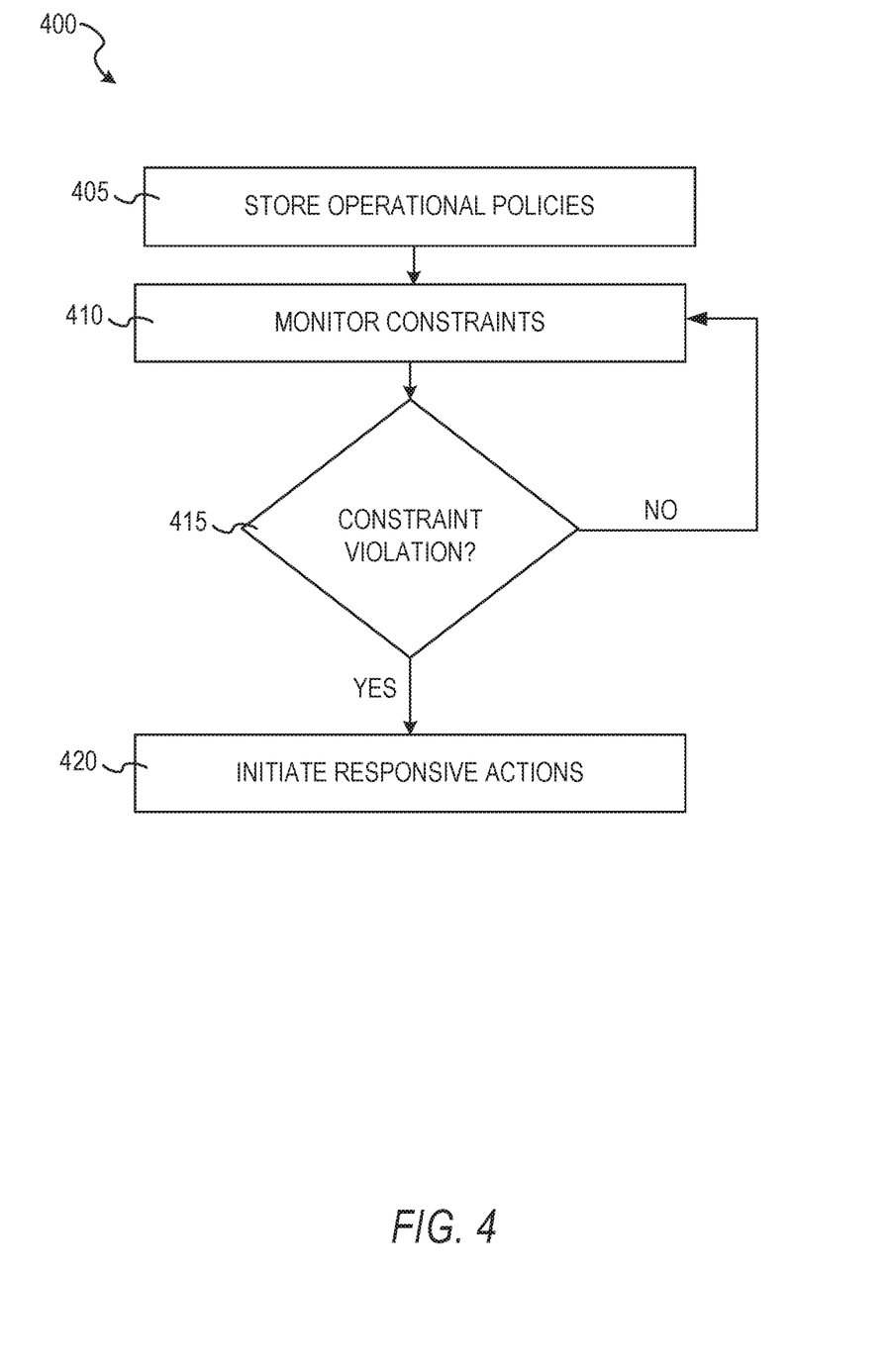
FIG. 4 shows a flow diagram of a method for managing a multiuse certificate by monitoring applications associated with the given multiuse certificate, according to some example embodiments.

FIG. 4 shows a flow diagram of a method 400 for managing a multiuse certificate by monitoring applications associated with the given multiuse certificate, according to some example embodiments. As discussed above with reference to FIG. 3, determination of whether computational constraints are violated is performed in response to receiving or during a connection request. FIG. 4 shows an example embodiment in which the applications are continually (e.g., periodically) monitored and responsive actions may be triggered in response to determining that one or more constraints have been violated.

At operation 405, the policy engine 210 stores operational policies to a data store (e.g., the database 126, the wildcard data 525) accessible to the constraint certificate system 150. At operation 410, the constraint engine 215 actively monitors the applications as they operate by collecting operational parameter data specified by the computational constraints. For example, at operation 410, the constraint engine 215 creates a record of file system usage, processor usage, memory usage, etc. of the several applications covered by a multiuse certificate.

At operation 415, the constraint engine 215 analyzes the stored operational parameter data to determine whether any of the monitored applications have violated their respective computational constraints. In some example embodiments, at operation 415, the constraint engine 215 periodically checks (e.g., every ten seconds, every five minutes, every hour) the stored operational parameter data to determine whether constraints have been violated. In some example embodiments, at operation 415, trigger code (e.g., Key Value Observing, KVO) observes the monitored values and notifies the constraint engine 215 of a transgression of constraints.

Assuming that the monitored applications have not violated the computational constraints, the method 400 returns to operation 410, where monitoring continues. In contrast, if the monitored applications have violated the computational constraints, the constraint engine 215 passes log information describing the violation (e.g., which application, which subdomain and domain, which multiuse certificate, the type and magnitude of the transgression) to the response engine 220 for further action.

At operation 420, in response to receiving notification that one or more of the applications have violated their computational constraints, the response engine 220 initiates responsive actions. According to some example embodiments, responsive actions include revoking the multiuse certificate that covers the one or more subdomains in which the offending applications are installed. In some example embodiments, responsive actions include inhibiting the offending one or more applications by temporarily suspending them (until an administrative user can clear them). Further responsive actions include permanently terminating the offending one or more applications, and rejecting requests to connect to the offending one or more applications. In some example embodiments, the responsive actions performed at operation 420 by the response engine 220 also include logging information describing the violation events for later analysis by administrative users. Further, the response engine 220 may also generate one or more alerts to notify the administrative users.

Figure 5:
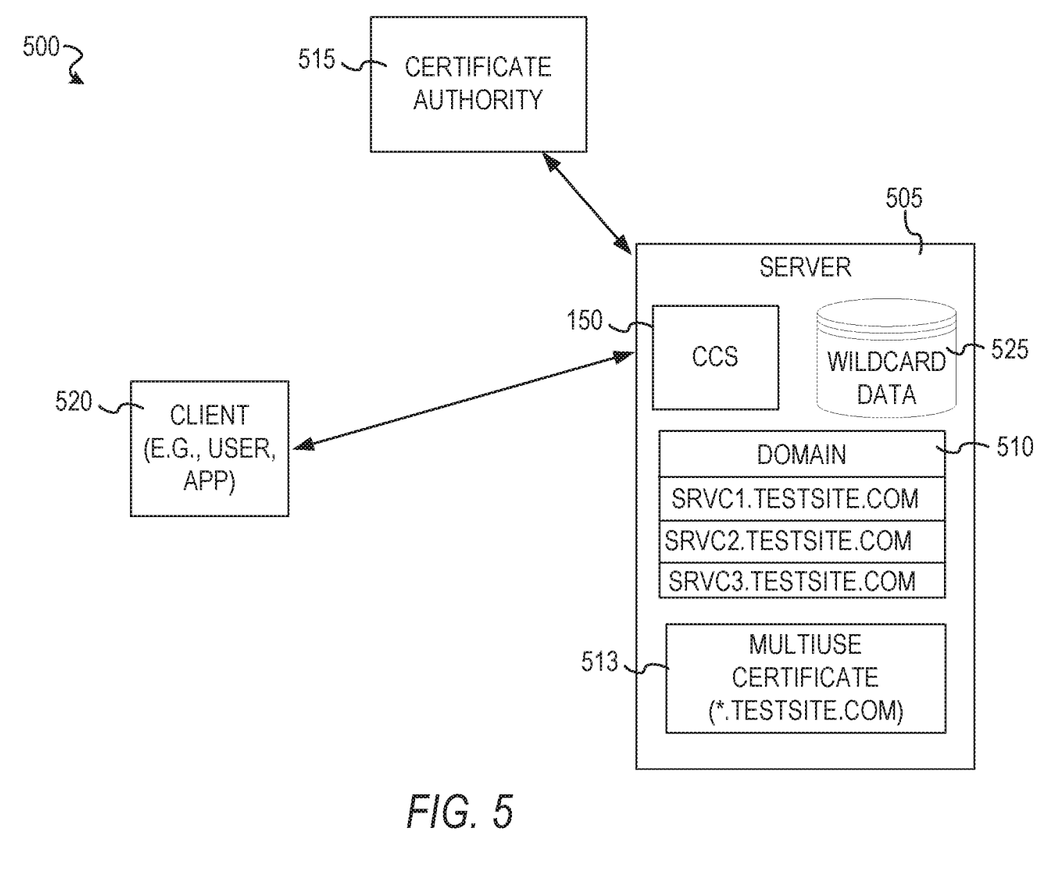
FIG. 5 shows an example network architecture of a server implementing constraint-based multiuse certificates, according to some example embodiments.

FIG. 5 shows an example network architecture 500 of a server 505 implementing constraint-based multiuse certificates, according to some example embodiments. As illustrated, the server 505 (an example embodiment of the application server 140, FIG. 1) can host a site at a domain 510 (e.g., "www.testsite.com"). The domain 510 comprises a plurality of subdomains, including "srvc1.testsite.com," which is the subdomain location of a first network service; "srvc2.testsite.com," which is the subdomain location of a second network service; and "srvc3.testsite.com," which is the subdomain location of a third network service. A multiuse certificate 513 can cover the multiple subdomains as indicated by an asterisk character in the subdomain field ("*.testsite.com," where "*" is a wildcard character).

In some example embodiments, the server 505 can request a multiuse certificate from a certificate authority 515, which is an entity that both a client 520 and the server 505 trust. In some example embodiments, the certificate authority 515 is an external third-party CA, such as Symantec®. Further, in some example embodiments, the certificate authority 515 is an internal network computer of an organization, e.g., a network computer in charge of a company's root certificates.

According to some example embodiments, the multiuse certificate 513 granted by the certificate authority 515 is associated by a constraint certificate system 150 with computational constraints and policies, which are stored as wildcard data 525 in memory accessible to the server 505. As the different applications (e.g., network services) operate from their respective subdomains, the constraint certificate system 150 (e.g., the constraint engine 215) monitors the applications and stores operational data describing their operating parameters in a data store accessible to the response engine 220, e.g., the database 126.

Figure 6:
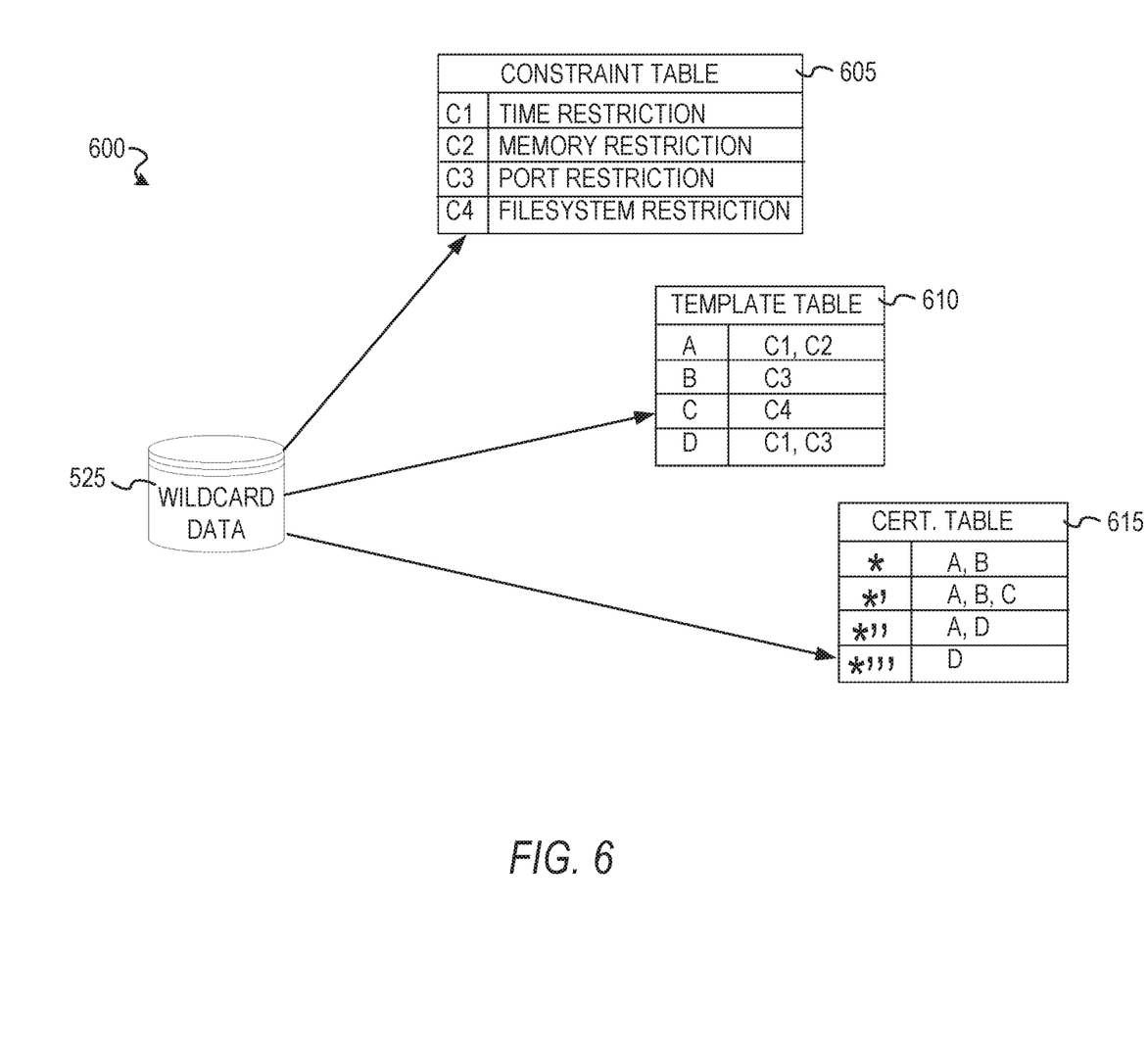
FIG. 6 shows an example data architecture according to which wildcard data may be configured, according to some example embodiments.

FIG. 6 shows an example data architecture 600 according to which the wildcard data 525 may be configured, according to some example embodiments. As illustrated, the wildcard data 525 may include a constraint table 605, a template table 610, and a certificate table 615. As discussed above, updates to the constraint certificate system 150 can be performed by updating values and/or associations in the tables in the wildcard data 525. Further, although the constraint table 605, the template table 610, and the certificate table 615 are implemented as tables (e.g., tables of a relational database system) in the illustrated example, it is appreciated by those of ordinary skill in the art that the wildcard data 525 can be stored in other types of data structures (e.g., column families of HBase), according to some example embodiments.

The constraint table 605 comprises entries that correspond to each type of constraint. For example, the C1 constraint is a time restriction for a given application, C2 is a memory restriction for a given application, C3 is a port restriction for a given application, and C4 is a file system restriction for a given application. Although only four constraints are displayed in the constraint table 605, it is to be appreciated that the constraint table 605 may store any further type of computational constraints that can be used to monitor code operating at a given domain or subdomain. Further, although not illustrated, it is to be appreciated that the constraint table 605 may include further information (e.g., columns), such as values for the given restrictions (e.g., length of time, amount of memory threshold, allowed ports, allowed file systems, and so on).

The template table 610 associates each of one or more policies, such as Policy A ("A"), Policy B ("B"), Policy C ("C"), and Policy D ("D"), with one or more constraints. For example, as illustrated, C1 and C2 are assigned to Policy A; C3 is assigned to Policy B; C4 is assigned to Policy C; and C1 and C3 are assigned to Policy D.

The certificate table 615 associates each of one or more different wildcard certificates with one or more policies. For example, as illustrated, Policies A and B are assigned to a first multiuse certificate designated by an asterisk, e.g., *; Policies A, B, and C are assigned to a second multiuse certificate designated by an asterisk prime, e.g., *'; Policies A and D are assigned to a third multiuse certificate designated by an asterisk double prime, e.g., *"; and Policy D is assigned to a fourth multiuse certificate designated by an asterisk triple prime, e.g., *'''. In some example embodiments, a given multiuse certificate may specify its associated policies in metadata of the multiuse certificate.

Figure 7:
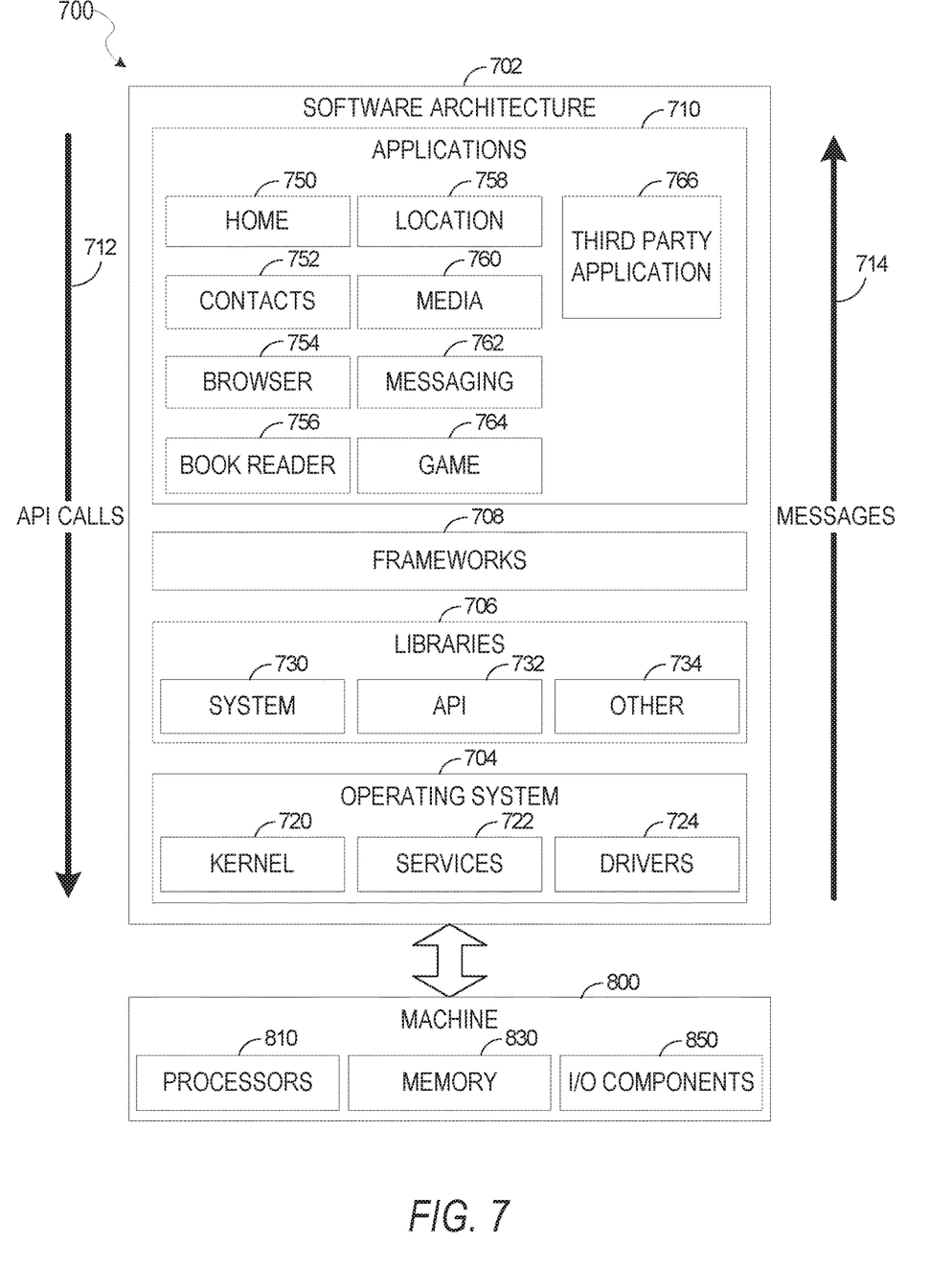
FIG. 7 is a block diagram illustrating an architecture of software, which can be installed on any one or more of the devices described above.

FIG. 7 is a block diagram 700 illustrating an architecture of software 702, which can be installed on any one or more of the devices described above. FIG. 7 is merely a non-limiting example of a software architecture, and it will be appreciated that many other architectures can be implemented to facilitate the functionality described herein. In various embodiments, the software 702 is implemented by hardware such as a machine 800 of FIG. 8 that includes processors 810, memory 830, and I/O components 850. In this example architecture, the software 702 can be conceptualized as a stack of layers where each layer may provide a particular functionality. For example, the software 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system or platform.

In an example embodiment, the applications 710 include a home application 750, a contacts application 752, a browser application 754, a book reader application 756, a location application 758, a media application 760, a messaging application 762, a game application 764, and a broad assortment of other applications such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
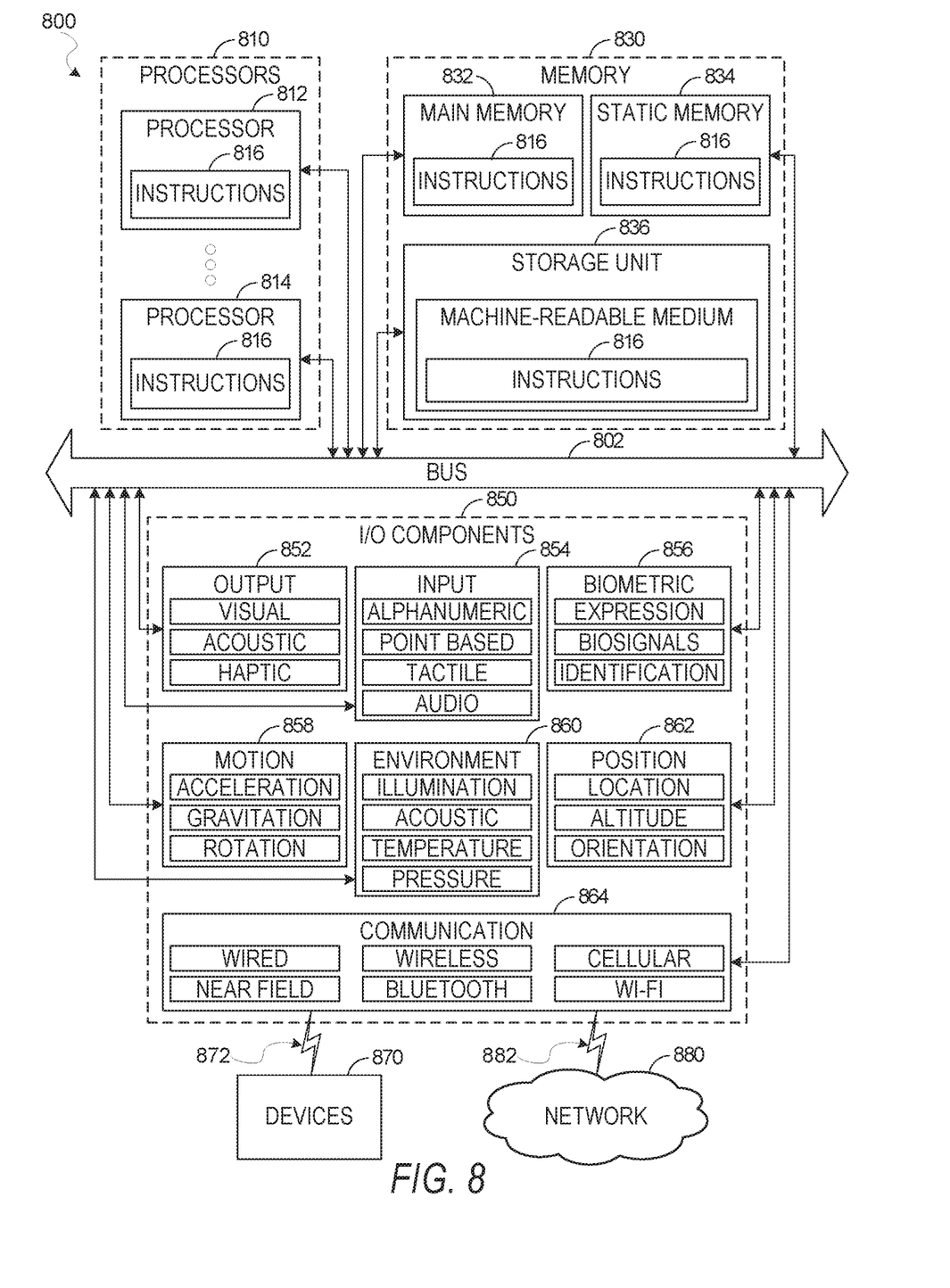
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method 200 of FIG. 2, the method 300 of FIG. 3, or the method 400 of FIG. 4. Additionally, or alternatively, the instructions 816 may implement FIGS. 1-6, and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions contemporaneously. Although FIG. 8 shows multiple processors 810, the machine 800 may include a single processor with a single core, a single processor with multiple cores (e.g., a multi-core processor), multiple processors with a single core, multiple processors with multiples cores, or any combination thereof.

The memory 830 may include a main memory 832, a static memory 834, and a storage unit 836, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, Near Field Communication (NFC) components, Bluetooths® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 830, 832, 834, and/or the memory of the processor(s) 810) and/or the storage unit 836 may store one or more sets of instructions and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 880 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A method performed via hardware processing circuitry, the method comprising:
    storing policies for network certificates, each policy specifying one or more computing resource consumption constraints and each network certificate associated with one or more domains;
    identifying a network certificate covering operations of a network application based in part on the one or more domains associated with the identified network certificate;
    identifying, from the identified network certificate, a stored policy enforced on applications covered by the identified network certificate, the stored policy including a constraint on computing resource consumption for network applications accessing a subdomain covered by the identified network certificate;
    monitoring consumption of computing resources by the network application covered by the identified network certificate;
    determining that the monitored consumption of computing resources by the network application satisfies the computing resource consumption constraint associated with the stored policy; and
    authenticating the network application based at least in part on the computing resource consumption constraint being satisfied by the network application.

2. The method of claim 1, wherein the network application is authenticated in response to the determining that the monitored consumption of computing resources of the network application satisfies the computing resource consumption constraint of the identified network certificate.

3. The method of claim 1, further comprising:
    determining that a further network certificate covers a further network application;
    identifying a further policy associated with the further network certificate;
    identifying a further computing resource consumption constraint specified by the identified policy;
    monitoring the further network application to determine whether a computing resource consumption of the further network application violates the further computing resource consumption constraint, specified by further policy; and
    in response to determining that the computing resource consumption of the further network application has violated the further computing resource consumption constraint, inhibiting the further network application.

4. The method of claim 3, wherein inhibiting the further network application includes at least one of rejecting one or more network requests for the further network application or suspending the further network application from operating.

5. The method of claim 3, wherein monitoring the further network application comprises:
    periodically storing computing resource consumption data of the further network application as the further network application functions; and
    determining, using the stored computing resource consumption data, that the computing resource consumption of the further network application has violated the further computing resource consumption constraint specified by the one or more further policies.

6. The method of claim 5, wherein the computing resource consumption data includes at least one of file system usage of the further network application, port usage of the further network application, or memory usage of the further network application, and wherein the determining that the computing resource consumption of the further network application has violated the further computing resource consumption constraint comprises determining whether file system usage, port usage, or memory usage of the further network application exceeds a corresponding file system usage limit, port usage limit, or memory usage limit specified by the one or more further policies.

7. The method of claim 1, wherein the one or more computing resource consumption constraints include one or more of: one or more file system restrictions on the network application while covered by the identified network certificate, one or more network port restrictions on the network application while covered by the identified network certificate, one or more memory restrictions on the network application while covered by the identified network certificate, one or more memory segment restrictions on the network application while covered by the identified network certificate, one or more time duration restrictions on the network application while covered by the identified network certificate, or one or more allowed time of day restrictions of the network application while covered by the identified network certificate.

8. The method of claim 1, wherein the monitoring comprises comprises monitoring code of the network application covered by the identified network certificate operating in a domain or subdomain specified by the identified network certificate.

9. The method of claim 1, wherein the identified network certificate is a multi-use certificate, and defines, via associated policies, computer resource consumption constraints that any network application operating within a domain or subdomain covered by the network certificate must conform with when authenticated for operation within the domain or subdomain.

10. The method of claim 1, wherein the network certificates are multiple use certificates configured to authenticate multiple subdomains of a domain, and a policy identified by stored information to apply to a network application covered by a particular network certificate is applied to network applications accessing any one of the multiple subdomains.

11. The method of claim 1, wherein the network certificates are wildcard certificates.

12. A system comprising:
one or more hardware processors of a machine; and
a memory storing instructions that, when executed by the one or more hardware processors, cause the machine to perform operations comprising:
storing policies for network certificates, each policy specifying one or more computing resource consumption constraints and each network certificate associated with one or more domains;
identifying a network certificate covering operations of a network application based in part on the one or more domains associated with the identified network certificate;
identifying, from the identified network certificate, a stored policy enforced on applications covered by the identified network certificate, the stored policy including a constraint on computing resource consumption for network applications accessing a subdomain covered by the identified network certificate;
monitoring consumption of computing resources by the network application covered by the identified network certificate;
determining that the monitored consumption of the computing resources of the network application satisfies the computing resource consumption constraint associated with the stored policy; and
authenticating the network application based at least in part on the computing resource consumption constraint being satisfied by the network application.

13. The system of claim 12, wherein the network application is authenticated in response to the determining that the network application satisfies the computing resource consumption constraint of the identified network certificate.

14. The system of claim 12, the operations further comprising:
determining that a further network certificate is associated with a further network application;
monitoring the further network application to determine whether computing resource consumption of the further network application violates further computing resource consumption constraints of the further network certificate; and
in response to determining that the computing resource consumption of the further network application has violated the further computing resource consumption constraints, inhibiting the further network application, wherein inhibiting the further network application includes at least one of rejecting one or more network requests for the further network application or suspending the further network application from operating.

15. The system of claim 14, wherein monitoring the further network application comprises:
periodically storing computing resource consumption data of the further network application as the further network application functions; and
determining, using the stored computing resource consumption data, that the further network application has violated the further computing resource consumption constraints associated with the further network certificate.

16. The system of claim 15, wherein the computing resource consumption of the further network application includes at least one of: file system usage of the further network application, port usage of the further network application, or memory usage of the further network application.

17. The system of claim 12, wherein the one or more computing resource consumption constraints include one or more of: one or more file system restrictions, one or more port restrictions, one or more memory restrictions, one or more memory segment restrictions, one or more time duration restrictions, or one or more allowed time of day restrictions.

18. A machine-readable storage device embodying instructions that, when executed by a machine, cause the machine to perform operations comprising:
storing policies for network certificates, each policy specifying one or more computing resource consumption constraints and each network certificate associated with one or more domains;
identifying a network certificate covering operations of a network application based in part on the one or more domains associated with the identified network certificate;
identifying, from the identified network certificate, a stored policy enforced on applications covered by the identified network certificate, the stored policy including a constraint on computing resource consumption for network applications accessing a subdomain covered by the identified network certificate;
monitoring consumption of computing resources by the network application covered by the identified network certificate;
determining that the monitored computing resource consumption of the network application satisfies the computing resource consumption constraint associated with the stored policy; and
authenticating the network application based at least in part on the computing resource consumption constraint being satisfied by the network application.

19. The machine-readable storage device of claim 18, wherein the network application is authenticated in response to the determining that the computing resource consumption of the network application satisfies the computing resource consumption constraint of the identified network certificate.

* * * * *